US012090881B2

(12) United States Patent
Salter et al.

(10) Patent No.: US 12,090,881 B2
(45) Date of Patent: *Sep. 17, 2024

(54) SYSTEMS AND METHODS FOR CONTROLLING POWER FLOW BETWEEN ELECTRIFIED VEHICLES AND CHARGING TRAILERS DURING IN-FLIGHT ENERGY TRANSFERS

(71) Applicant: FORD GLOBAL TECHNOLOGIES, LLC, Dearborn, MI (US)

(72) Inventors: Stuart C. Salter, White Lake, MI (US); James Baumbick, Northville, MI (US); Ryan O'Gorman, Beverly Hills, MI (US); Peter Phung, Windsor (CA); Michael J. Kipley, Saline, MI (US); Katherine Howard-Cone, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 290 days.

This patent is subject to a terminal disclaimer.

(21) Appl. No.: 17/547,965

(22) Filed: Dec. 10, 2021

(65) Prior Publication Data

US 2023/0182600 A1  Jun. 15, 2023

(51) Int. Cl.
*B60L 53/60* (2019.01)
*B60L 53/30* (2019.01)
*B60P 3/06* (2006.01)

(52) U.S. Cl.
CPC ............... *B60L 53/60* (2019.02); *B60L 53/30* (2019.02); *B60P 3/06* (2013.01); *B60L 2240/66* (2013.01); *B60L 2240/68* (2013.01)

(58) Field of Classification Search
CPC .......... B60L 53/66; B60L 53/64; B60L 50/00; B60L 58/20; B60L 50/61; B60L 58/13;
(Continued)

(56) References Cited

U.S. PATENT DOCUMENTS

2004/0084963 A1* 5/2004 Costello ............... B60T 1/10
307/9.1
2013/0257144 A1* 10/2013 Caldeira ............ B60L 58/20
307/9.1
(Continued)

FOREIGN PATENT DOCUMENTS

CN  109195828 A  * 1/2019 ............. B60L 50/00
JP  2015032055 A    2/2015

*Primary Examiner* — Yuri Kan
(74) *Attorney, Agent, or Firm* — David B. Kelley; Carlson, Gaskey & Olds, P.C.

(57) ABSTRACT

Systems and methods are provided for coordinating and controlling power flow during in-flight bidirectional energy transfer events between an electrified vehicle, one or more charging trailers, and optionally, one or more electrified recreational vehicles. The systems and methods may prioritize energy transfers between each connected energy unit based on various parameters, including but not limited to in-transit travel logistics, environmental information, time of day, etc. Charge energy may be transferred to the appropriate power source to meet customer needs with varying levels of priority according to an energy transfer prioritization control strategy that is derived from the various inputs that are considered.

9 Claims, 7 Drawing Sheets

(58) Field of Classification Search
CPC ........ B60L 53/60; B60L 53/305; B60L 58/14;
B60T 8/1708; B60T 1/10; B62D 59/04;
H02J 7/0048; H02J 13/00006; H02J
50/10; B60K 1/04; B25J 11/00
See application file for complete search history.

(56) References Cited

U.S. PATENT DOCUMENTS

| | | | |
|---|---|---|---|
| 2013/0257145 A1* | 10/2013 | Caldeira | B60L 50/61 |
| | | | 307/9.1 |
| 2017/0067341 A1* | 3/2017 | Baiden | B25J 11/00 |
| 2019/0047427 A1 | 2/2019 | Pogorelik | |
| 2020/0231057 A1* | 7/2020 | Hishida | H02J 13/00006 |
| 2020/0369334 A1* | 11/2020 | Lee | B60K 1/04 |
| 2020/0376972 A1 | 12/2020 | Martin et al. | |
| 2021/0070138 A1 | 3/2021 | Schumacher et al. | |
| 2021/0162874 A1* | 6/2021 | Lee | H02J 7/0048 |
| 2022/0024328 A1* | 1/2022 | Cameron | H02J 50/10 |
| 2022/0169085 A1* | 6/2022 | Marmara | B60T 8/1708 |
| 2022/0294244 A1* | 9/2022 | Helm | B60L 58/13 |
| 2023/0068557 A1* | 3/2023 | Burkhart | B62D 59/04 |
| 2023/0202337 A1* | 6/2023 | Ricke | B60L 53/64 |
| | | | 705/412 |

* cited by examiner

SYSTEMS AND METHODS FOR CONTROLLING POWER FLOW BETWEEN ELECTRIFIED VEHICLES AND CHARGING TRAILERS DURING IN-FLIGHT ENERGY TRANSFERS

TECHNICAL FIELD

This disclosure relates generally to systems and methods for coordinating and controlling prioritized in-flight bidirectional energy transfers between charging trailers and electrified vehicles.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Plug-in type electrified vehicles include one or more charging interfaces for charging the traction battery pack. Plug-in type electrified vehicles are most commonly charged while parked at a charging station or some other utility power source.

SUMMARY

A bidirectional energy transfer system according to an exemplary aspect of the present disclosure includes, among other things, an electrified vehicle, a charging trailer coupled to the electrified vehicle, and a control module programmed to control a transfer of energy from the charging trailer to the electrified vehicle during an in-flight energy transfer event based, at least in part, on real-time prognostic information associated with the electrified vehicle.

In a further non-limiting embodiment of the foregoing system, an electrified recreational vehicle is coupled to the charging trailer.

In a further non-limiting embodiment of either of the foregoing systems, the control module is further programmed to control a transfer of energy from at least one of the charging trailer or the electrified vehicle to the electrified recreational vehicle during the in-flight energy transfer event.

In a further non-limiting embodiment of any of the foregoing systems, the control module is further programmed to interface with a bidirectional power transfer system of the electrified vehicle for controlling the transfer of the energy from the charging trailer to the electrified vehicle during the in-flight energy transfer event.

In a further non-limiting embodiment of any of the foregoing systems, the control module is a component of the electrified vehicle.

In a further non-limiting embodiment of any of the foregoing systems, the control module is a component of a cloud-based server system.

In a further non-limiting embodiment of any of the foregoing systems, the control module is further programmed to create an energy transfer prioritization control strategy for controlling the transfer of the energy to the electrified vehicle during the in-flight energy transfer event.

In a further non-limiting embodiment of any of the foregoing systems, the energy transfer prioritization control strategy includes a priority ranking score assigned to a traction battery pack of the electrified vehicle.

In a further non-limiting embodiment of any of the foregoing systems, the control module is further programmed to automatically update the priority ranking score during the in-flight energy transfer event based on a real-time trajectory of the electrified vehicle, a real-time weather condition, a real-time traffic condition, or an anticipated physical route condition.

In a further non-limiting embodiment of any of the foregoing systems, the control module is programmed to control the transfer of the energy from the charging trailer to the electrified vehicle during the in-flight energy transfer event based on battery prognostic information, trailer-specific information associated with the charging trailer, environmental information, and/or itinerary/calendar information.

An electrified vehicle according to another exemplary aspect of the present disclosure includes, among other things, a traction battery pack and a control module programmed to create an energy transfer prioritization control strategy for controlling a transfer of energy to the traction battery pack from another energy unit during an in-flight energy transfer event of the electrified vehicle.

In a further non-limiting embodiment of the foregoing electrified vehicle, the energy transfer prioritization control strategy includes a priority ranking score assigned to the traction battery pack.

In a further non-limiting embodiment of either of the foregoing electrified vehicle systems, the energy transfer prioritization control strategy is derived based on battery prognostic information associated with the traction battery pack.

In a further non-limiting embodiment of any of the foregoing electrified vehicle systems, the energy transfer prioritization control strategy is derived based on real-time prognostic information associated with the electrified vehicle.

In a further non-limiting embodiment of any of the foregoing electrified vehicle systems, the energy transfer prioritization control strategy is derived based on itinerary/calendar information associated with a user of the electrified vehicle.

In a further non-limiting embodiment of any of the foregoing electrified vehicle systems, the energy transfer prioritization control strategy is derived based on a real-time weather condition.

In a further non-limiting embodiment of any of the foregoing electrified vehicle systems, the energy transfer prioritization control strategy is derived based on a real-time traffic condition.

In a further non-limiting embodiment of any of the foregoing electrified vehicle systems, the energy transfer prioritization control strategy is derived based on an anticipated physical route condition.

In a further non-limiting embodiment of any of the foregoing electrified vehicle systems, the control module is further programmed to control the transfer of the energy to the traction battery pack for achieving a full charge of the traction battery pack at a time that is as close as possible to when the electrified vehicle reaches a planned destination/waypoint.

In a further non-limiting embodiment of any of the foregoing electrified vehicle systems, the control module is further programmed to command a charge rate and a time for transferring the energy to the traction battery pack during the in-flight energy transfer event.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to systems and methods for coordinating and controlling power flow during in-flight bidirectional energy transfer events between an electrified vehicle, one or more charging trailers, and optionally, one or more electrified recreational vehicles. The systems and methods may prioritize energy transfers between each connected energy unit based on various parameters, including but not limited to in-transit travel logistics, environmental information, time of day, etc. Charge energy may be transferred to the appropriate power source to meet customer needs with varying levels of priority according to an energy transfer prioritization control strategy that is derived from the various inputs that are considered. These and other features of this disclosure are discussed in greater detail in the following paragraphs of this detailed description.

Figure 1:
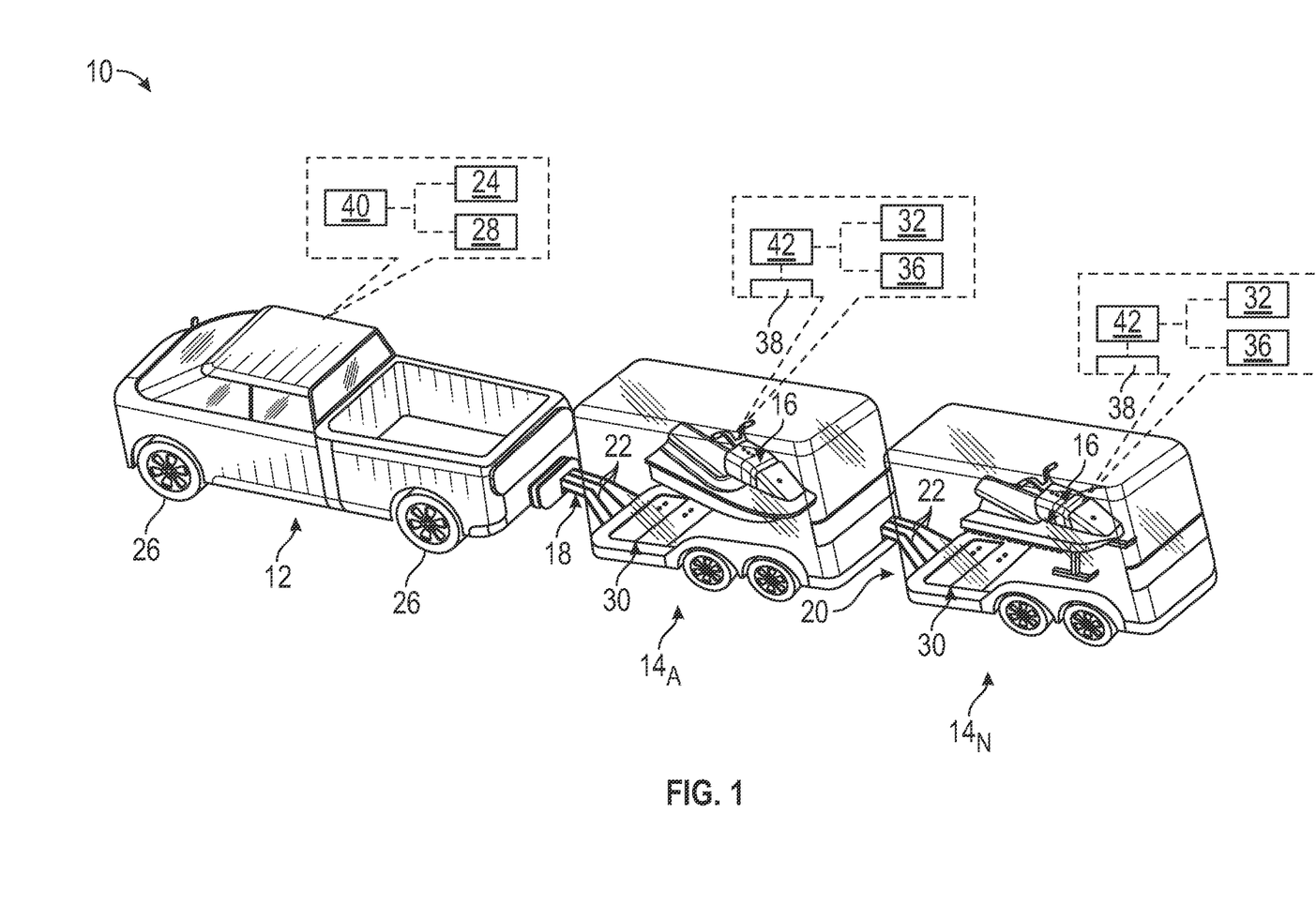
FIG. 1 schematically illustrates a bidirectional energy transfer system configured for transferring energy between an electrified vehicle and one or more charging trailers.

FIG. 1 schematically illustrates an exemplary bidirectional energy transfer system 10 (hereinafter "the system 10") for bidirectionally transferring energy between multiple electrified units. In particular, the system 10 may be utilized for controlling the power flow between a towing or leading electrified vehicle 12 and one or more charging trailers $14_A$ to $14_N$, where "N" represents any number. The charging trailers 14 may be operably connected in series to the electrified vehicle 12. Unless stated otherwise herein, reference numeral "14" may refer to any of the charging trailers when used without any alphabetic identifier immediately following the reference numeral.

Energy may be bidirectionally transferred between the electrified vehicle 12 and the one or more charging trailers 14 either while the structures are stationary or during "in-flight" events. In this disclosure, the term "in-flight" means during the coupled movement of the electrified vehicle 12 and the one or more charging trailers 14, such as when the electrified vehicle 12 is hauling or towing the one or more charging trailers 14. Accordingly, the system 10 is capable of effectively managing the bidirectional transfer of energy from the electrified vehicle 12 to the one or more charging trailers 14 or vice-versa while the respective electrified units are making forward progress toward a desired destination/waypoint.

The charging trailers 14 may be coupled to the electrified vehicle 12 in a daisy-chain configuration. For example, a first towing device 18 may releasably couple the charging trailer $14_A$ to the electrified vehicle 12, a second towing device 20 may releasably couple the charging trailer $14_N$ to the charging trailer $14_A$, and so on for enabling a towing event in which energy transfers between the various energy units can be executed. Each towing device 18, 20 may include electrical cabling 22 for enabling energy transfers between the various energy units of the system 10. The specific configuration of each towing device 18, 20 is not intended to limit this disclosure.

Each charging trailer 14 may optionally haul/store/house one or more electrified recreational vehicles 16. The system 10 may thus be configured for achieving bidirectional energy transfers between each of the electrified vehicle 12, the one or more charging trailers 14, and the one or more electrified recreational vehicles 16. Although one electrified vehicle 12, two charging trailers 14, and two electrified recreational vehicles 16 are illustrated as being part of the system 10 of FIG. 1, this disclosure is not limited to that specific configuration of the system 10.

The electrified vehicle 12 of FIG. 1 is schematically illustrated as a pickup truck. However, other electrified vehicle configurations are also contemplated. The teachings of this disclosure may be applicable for any type of vehicle as the electrified vehicle 12. For example, the electrified vehicle 12 could be configured as a car, a truck, a van, a sport utility vehicle (SUV), etc.

The electrified recreational vehicle 16 of the charging trailer $14_A$ is schematically illustrated as a personal watercraft, and the electrified recreational vehicle 16 of the charging trailer $16_N$ is schematically illustrated as a snowmobile. However, other recreational vehicle configurations are also contemplated. The teachings of this disclosure may be applicable for any type of recreational vehicle. For example, the one or more electrified recreational vehicles 16 could include any combination of all-terrain vehicles (ATV), utility vehicles (UTV), motorcycles, bikes, dirt bikes, snowmobiles, off-road vehicles, personal watercrafts, etc.

In an embodiment, the electrified vehicle 12 is a plug-in type electrified vehicle (e.g., a plug-in hybrid electric vehicle (PHEV) or a battery electric vehicle (BEV)). The electrified vehicle 12 may include an electrified powertrain capable of applying a torque from an electric machine 24 (e.g., an electric motor) for driving one or more drive wheels 26 of the electrified vehicle 12. The electrified vehicle 12 may include a traction battery pack 28 for powering the electric machine 24 and other electrical loads of the electrified vehicle 12. The powertrain of the electrified vehicle 12 may electrically propel the drive wheels 26 either with or without the assistance of an internal combustion engine.

In an embodiment, each charging trailer 14 may include an energy storage system 30 adapted for storing electrical energy that can be utilized to charge the electrified vehicle 12 and/or one or more of the electrified recreational vehicles 16. Each energy storage system 30 may include in an exemplary embodiment a battery bank having a plurality of interconnected battery cells capable of storing electrical energy. However, other types of energy storage devices are also contemplated within the scope of this disclosure.

In an embodiment, each electrified recreational vehicle 16 is an all-electric recreational vehicle having an electrified powertrain capable of applying torque from an electric machine 32 (e.g., an electric motor) for driving one or more drive devices (e.g., wheel, pump, etc.) of the electrified recreational vehicle 16. Each electrified recreational vehicle 16 may further include a traction battery pack 36 for powering the electric machine 32. The powertrain of each electrified recreational vehicle 16 may electrically propel the drive device without the assistance of an internal combustion engine.

Although a specific component relationship is illustrated in the figures of this disclosure, the illustrations are not intended to limit this disclosure. The placement and orientation of the various components of the depicted vehicles are shown schematically and could vary within the scope of this disclosure. In addition, the various figures accompanying this disclosure are not necessarily drawn to scale, and some features may be exaggerated or minimized to emphasize certain details of a particular component.

Although shown schematically, the traction battery pack 28 of the electrified vehicle 12 may be configured as a high voltage traction battery pack that includes a plurality of battery arrays (i.e., battery assemblies or groupings of battery cells) capable of outputting electrical power to the electric machine 24 of the electrified vehicle 12. Other types of energy storage devices and/or output devices may also be used to electrically power the electrified vehicle 12.

The traction battery pack 36 of each electrified recreational vehicle 16 may be a removable high voltage traction battery that includes a plurality of battery cells or groupings of battery cells. In an embodiment, each traction battery pack 36 is a removable traction battery that may be swapped out and replaced with another traction battery.

In general, the traction battery pack 36 of each electrified recreational vehicle 16 is a smaller battery than the traction battery pack 28 of the electrified vehicle 12. However, both batteries are capable of supplying high voltage power for electrically propelling the electrified vehicle 12 or the respective electrified recreational vehicle 16. From time to time, the traction battery pack 28 and/or the traction battery pack 36 must be recharged to replenish their respective energy stores. As further discussed below, the system 10 may be configured to coordinate and control the exchange of charge energy between various energy units of the system 10.

The electrified vehicle 12 may additionally include a bidirectional power transfer system 40. The bidirectional power transfer system 40 may be configured for enabling the bidirectional transfer of power to/from the electrified vehicle 12. The bidirectional power transfer system 40 may be operably connected between the charging trailer $14_A$ and the traction battery pack 28 of the electrified vehicle 12. The bidirectional power transfer system 40 may include various equipment, such as a charger, a DC-DC converter, a motor controller (which may be referred to as an inverter system controller or ISC), etc., arranged and configured to establish the bidirectional transfer of electrical energy between the traction battery pack 28 and another energy source (e.g., the energy storage system 30 of any charging trailer 14 and/or the traction battery pack 36 of any electrified recreational vehicle 16). The bidirectional power transfer system 40 may additionally be configured to transfer energy between the traction battery pack 28 and the electric machine 24.

Each electrified recreational vehicle 16 may additionally include a bidirectional power transfer system 42. The bidirectional power transfer system 42 may be operably connected between a charging interface 38 and the traction battery pack 36 of the electrified recreational vehicle 16. Each electrified recreational vehicle 16 may interface with the energy storage system 30 of its respective charging trailer 14 through the charging interface 38 for transferring energy between the traction battery pack 36 and the energy storage system 30. The charging interface 38 may be either a wired interface or a wireless interface.

The bidirectional power transfer system 42 may include various equipment, such as a charger, a DC-DC converter, a motor controller (which may be referred to as an inverter system controller or ISC), etc., arranged and configured to establish the bidirectional transfer of electrical energy between the traction battery pack 36 and another energy source (e.g., the energy storage system 30 of a respective charging trailer 14 and/or the traction battery pack 28 of the electrified vehicle 12). The bidirectional power transfer system 42 may additionally be configured to transfer energy between the traction battery pack 36 and the electric machine 32 of each electrified recreational vehicle 16.

One non-limiting example of a suitable bidirectional power transfer system that may be employed for use within the electrified vehicle 12 and/or the electrified recreational vehicles 16 for achieving bidirectional power transfers is disclosed within US Patent Publication No. 2020/0324665, assigned to Ford Global Technologies, LLC, the disclosure of which is incorporated by reference herein. However, other bidirectional power transfer systems could also be utilized for achieving the bidirectional transfers of power within the scope of this disclosure.

The system 10 may further be configured to provide "passthrough charging" such that charge energy from the charging trailer $14_N$ and/or the electrified recreational vehicle 16 of the charging trailer $14_N$ may be passed through the charging trailer $14_A$ for charging the traction battery pack 28, or vice versa. In this disclosure, the term "passthrough charging" indicates the ability of an energy unit to transfer all or a portion of the power stored therein to another energy unit for addressing that unit's energy needs without the other unit being directly connected to the unit that is providing the charge energy.

Figure 2:
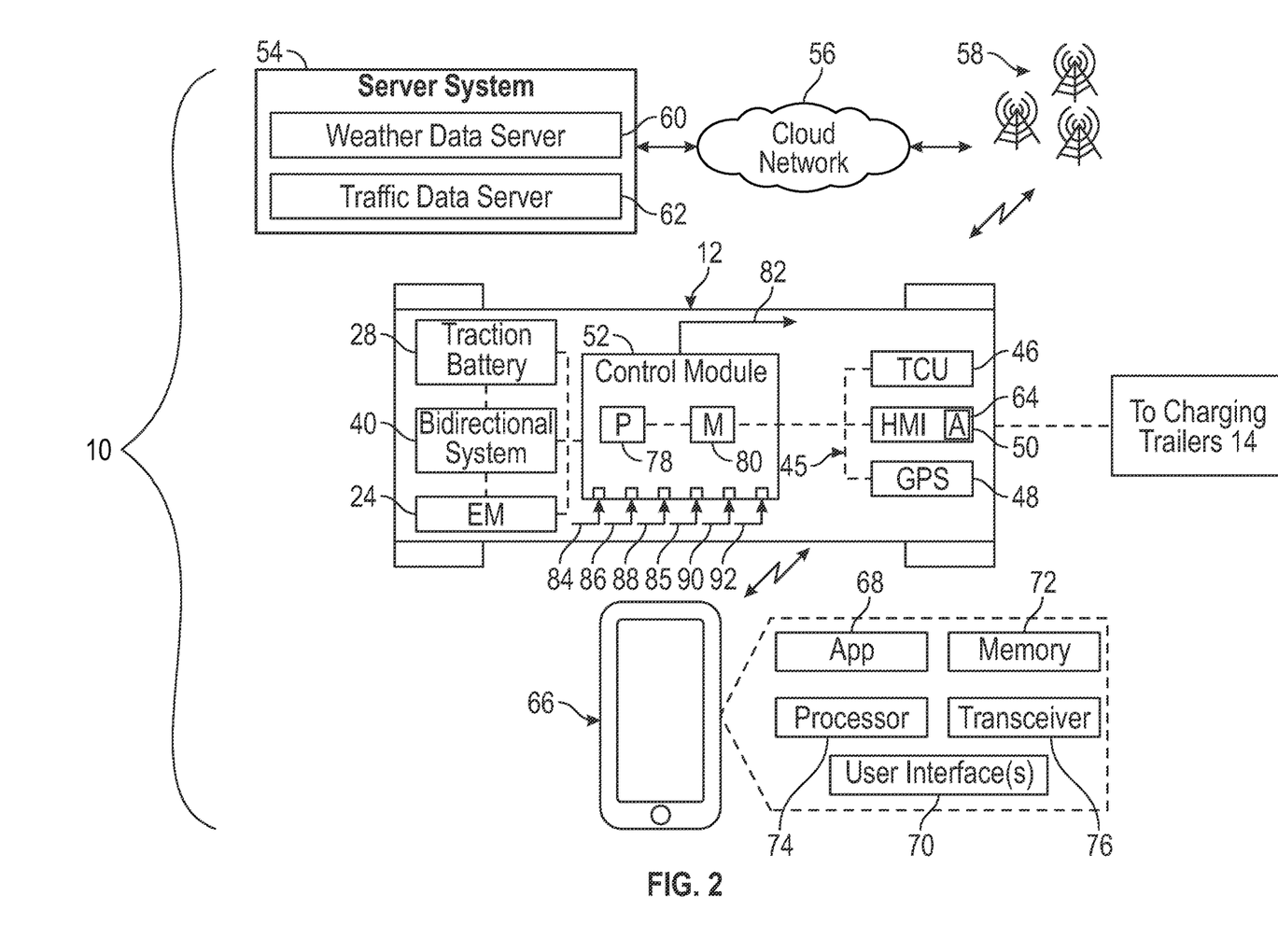
FIG. 2 schematically illustrates exemplary aspects of a bidirectional energy transfer system from the perspective of an electrified vehicle of the system.

Additional aspects of the system 10 of FIG. 1 are further detailed from the perspective of the electrified vehicle 12 in FIG. 2. In particular, FIG. 2 schematically illustrates features that enable the system 10 to coordinate and provide in-flight energy transfers between the electrified vehicle 12, the one or more charging trailers 14, and/or the one or more electrified recreational vehicles 16 based on a prioritization control strategy that may be derived by analyzing various input parameters. In this way, the system 10 may be equipped to effectively manage in-flight energy transfers between various electrified units prior to reaching the user's destination/waypoint.

As further part of the system 10, the electrified vehicle 12 may include a telecommunications module 46, a global positioning system (GPS) 48, a human machine interface (HMI) 50, and a control module 52. These and other components may be interconnected and in electronic communication with one another over a communication bus 45 of the electrified vehicle 12. The communication bus 45 may be a wired communication bus such as a controller area network (CAN) bus, or a wireless communication bus such as Wi-Fi, Bluetooth®, Ultra-Wide Band (UWB), etc.

The telecommunications module 46 may be configured for achieving bidirectional communications with a cloud-based server system 54, for example. The telecommunications module 46 may communicate over a cloud network 56 (e.g., the internet) to obtain various information stored on the server system 54 or to provide information to the server system 54 that can subsequently be accessed by the electrified vehicle 12 (and/or other participating units). The server system 54 can identify, collect, and store user data associated with the electrified vehicle 12 for validation purposes. Upon an authorized request, data may be subsequently transmitted to the telecommunications module 46 via one or more cellular towers 58 or some other known communication technique (e.g., Wi-Fi, Bluetooth®, data connectivity, etc.). The telecommunications module 46 can receive data from the server system 54 or can communicate data back to the server system 54 via the cellular tower(s) 58. Although not necessarily shown or described in this highly schematic embodiment, numerous other components may enable bidirectional communications between the electrified vehicle 12 and the server system 54.

The server system 54 may include various servers that store data that may be accessed by the system 10 for coordinating in-flight energy transfers between the electrified vehicle 12, the one or more charging trailers 14, and/or optionally the one or more electrified recreational vehicles 16. In an embodiment, the server system 54 includes a weather data server 60 that stores weather related data. The weather related data may include, but is not limited to, region specific weather history for a given locational area, storm metrics including current and forecasted windspeeds, current and forecasted rain fall or snowfall, current and forecasted temperatures, current and forecasted barometric pressures, presence and/or likelihood of extreme weather (e.g., heat waves, tornados, hurricanes, heavy snow fall/blizzards, wild fires, torrential rain falls, etc.), and current and forecasted trajectory of storms for any given location.

The weather data server 60 may be operated or managed, for example, by an organization such as the national weather service. Alternatively, the weather data server 60 may collect weather/climate related data from weather stations, news stations, remote connected temperature sensors, connected mobile device database tables, etc. The weather related data stored on the weather data server 60 could also be derived from crowd sourced weather information.

In another embodiment, the server system 54 includes a traffic data server 62. The traffic data server 62 may store data related to up-to-date traffic conditions associated with the roadways for any given location. The traffic related data may include, but is not limited to, traffic congestion information, emergency service dispatch information, etc. The traffic related data stored on the traffic data server 62 could be derived based on news feed information or crowd sourced information.

In a first embodiment, a user/owner of the electrified vehicle 12 may interface with the server system 54 using the HMI 50. For example, the HMI 50 may be equipped with an application 64 (e.g., FordPass™ or another similar web-based application) for allowing users to interface with the server system 54. The HMI 50 may be located within a passenger cabin of the electrified vehicle 12 and may include various user interfaces for displaying information to the vehicle occupants and for allowing the vehicle occupants to enter information into the HMI 50. The vehicle occupants may interact with the user interfaces presentable on the HMI 50 via touch screens, tactile buttons, audible speech, speech synthesis, etc.

In another embodiment, the user/owner of the electrified vehicle 12 may alternatively or additionally interface with the server system 54 for coordinating functions of the system 10 using a personal electronic device 66 (e.g., a smart phone, tablet, computer, wearable smart device, etc.). The personal electronic device 66 may include an application 68 (e.g., FordPass™ or another similar application) that includes programming to allow the user to employ one or more user interfaces 70 for setting or controlling certain aspects of the system 10. The application 68 may be stored in a memory 72 of the personal electronic device 66 and may be executed by a processor 74 of the personal electronic device 66. The personal electronic device 66 may additionally include a transceiver 76 that is configured to communicate with the server system 54 over the cellular tower(s) 58 or some other wireless link.

The GPS 48 is configured to pinpoint locational coordinates of the electrified vehicle 12. The GPS 48 may utilize geopositioning techniques or any other satellite navigation techniques for estimating the geographic position of the electrified vehicle 12 at any point in time. GPS data from the GPS 48 may be used to determine the weather and traffic data that is most relevant to the electrified vehicle 12 at any point in time, in an embodiment. In another embodiment, GPS data from the GPS 48 may be utilized to identify elevation/terrain variations along a given drive route.

The control module 52 may include both hardware and software and could be part of an overall vehicle control system, such as a vehicle system controller (VSC), or could alternatively be a stand-alone controller separate from the VSC. In an embodiment, the control module 52 is programmed with executable instructions for interfacing with and commanding operation of various components of the system 10. Although shown as separate modules within the highly schematic depiction of FIG. 2, the telecommunications module 46, the GPS 48, the HMI 50, and the control module 52 could be integrated together as part of common module of the electrified vehicle 12.

The control module 52 may include a processor 78 and non-transitory memory 80 for executing various control strategies and modes associated with the system 10. The processor 78 may be a custom made or commercially available processor, a central processing unit (CPU), or generally any device for executing software instructions. The memory 80 may include any one or combination of volatile memory elements and/or nonvolatile memory elements.

The processor 78 may be operably coupled to the memory 80 and may be configured to execute one or more programs stored in the memory 80 of the control module 52 based on the various inputs received from other devices, such as the server system 54, the telecommunications module 46, the GPS 48, the HMI 50, the one or more charging trailers 14, the one or more electrified recreational vehicles 16, etc. In an embodiment, the application 64 (e.g., FordPass™ or another similar application), which includes programming for allowing the vehicle user to employ one or more user interfaces within the HMI 50 for setting or controlling certain aspects of the system 10, may be stored in the memory 80 and may be executed by the processor 78 of the control module 52. Alternatively or additionally, the control module 52 may be configured to communicate and interface with the personal electronic device 66 for coordinating and/or executing certain aspects of the system 10 through the application 68.

The control module 52 may receive and process various inputs for creating an energy transfer prioritization control strategy 82 for controlling the transfer of energy between each of the electrified vehicle 12, the one or more charging trailers 14, and the one or more electrified recreational vehicles 16 during in-flight events. The energy transfer prioritization control strategy 82 may include, among other information, notifications and protocols for transferring or receiving energy at each energy unit (e.g., the traction battery pack 28 of the electrified vehicle 12, the energy storage system 30 of each charging trailer 14, and/or the traction battery pack 36 of each electrified recreational vehicle 16) associated with the system 10.

A first input that may be analyzed by the control module 52 for developing the energy transfer prioritization control strategy 82 may include battery prognostic information 84 received from each energy unit of the system 10. The battery prognostic information 84 may include information such as current state of charge (SOC), estimated travel range, current battery cell temperatures, charge rate levels, charge acceptance levels, battery cell aging information, etc. associated with the traction battery pack 28 of the electrified vehicle 12. Similar battery-related data may also be received from each energy storage system 30 of each connected charging trailer 14 and each traction battery pack 36 of each connected electrified recreational vehicles 16 (if any are connected).

A second input that may be analyzed by the control module 52 for developing the energy transfer prioritization control strategy 82 may include trailer-specific information 86 associated with each connected charging trailer 14 of the system 10. The trailer-specific information 86 may include information such as weight capacity and other relevant physical attributes of each connected charging trailer 14 of the system 10.

A third input that may be analyzed by the control module 52 for developing the energy transfer prioritization control strategy 82 may include real-time prognostic information 88 received from various components/subsystems of the electrified vehicle 12. The real-time prognostic information 88 may include information such as current location of the electrified vehicle 12 (e.g., GPS coordinates, cellular triangulation coordinates, etc.), real-time travel elements such as the current traveling speed of the electrified vehicle 12 (e.g., distance and time measurements), current estimated time of arrival to reach destination/waypoint, etc.

A fourth input that may be analyzed by the control module 52 for developing the energy transfer prioritization control strategy 82 may include environmental information 90 received from the server system 54 and/or the GPS 48. The environmental information 90 may include current weather information along the drive route (e.g., received from the weather data server 60), current traffic information along the drive route (e.g., received from the traffic data server 62), physical route conditions (e.g., altitude/elevation conditions expected to be experienced along the drive route; received from the GPS 48), etc. Adverse traffic, weather, and/or physical route conditions can delay or slow the electrified vehicle 12 while traveling along the drive route and may therefore be important considerations that may affect the rate of charge when transferring charge energy during in-flight events of the system 10.

A fifth input that may be analyzed by the control module 52 for developing the energy transfer prioritization control strategy 82 may include itinerary/calendar information 92 of the user associated with the electrified vehicle 12. The itinerary/calendar information 92 may include anticipated activity information such as upcoming drive routes planned by the user, frequently visited locations and expected arrival/departures times, home location and expected times parked at home location, scheduled activities of the user, etc. The itinerary/calendar information 92 may be received from the GPS 48 and/or from the server system 54 via the applications 64, 68. In an embodiment, an activity planner application of the personal electronic device 66 may be synced with the application 68 to provide an overall log of the user's anticipated activities in order to compliment the scheduled destination/waypoint indicated by the GPS 48. In another embodiment, the control module 52 may employ a neural network or machine learning techniques for inferring planned activities that may occur during each planned drive route of the electrified vehicle 12.

A sixth input that may be analyzed by the control module 52 for developing the energy transfer prioritization control strategy 82 may include recreational vehicle-specific information 85 associated with each connected electrified recreational vehicle 16 of the system 10. The recreational vehicle-specific information 85 may include information such various relevant physical attributes of each connected electrified recreational vehicle 16 of the system 10.

The inputs referenced above are intended to be exemplary only. Various other inputs could be considered by the control module 52 for developing the energy transfer prioritization control strategy 82 described herein.

In response to receiving and analyzing the various input signals, the control module 52 may prepare the energy transfer prioritization control strategy 82. As part of developing the energy transfer prioritization control strategy 82, the control module 52 may assign a priority ranking score to each electrified unit of the system 10. The assigned priority ranking score may be a number (e.g., an integer) that represents a priority ranking of the order in which charge energy from the one or more charging trailers 14 will be transferred to the electrified vehicle 12 and/or the one or more electrified recreational vehicles 16 at any given point in time during an in-flight event. In an embodiment, lower priority ranking scores indicate a lower priority for receiving charge energy at any given point of time during the in-flight event, and higher priority ranking scores indicate a higher priority for receiving the charge energy at any given point of time during the in-flight event.

The priority ranking score may be based on a variety of factors. A first factor relevant to assigning each priority ranking score may include the functional status of each electrified unit of the system 10. For example, energy transfer to a respective energy unit of the system 10 may be inhibited during error states of the electrified unit. Thus, when error states occur, the respective electrified unit experiencing the error state may be assigned a lower priority ranking score within the energy transfer prioritization control strategy 82.

A second factor relevant to assigning each priority ranking score may include the energy requirements (e.g., updated prediction accuracy of energy required to complete drive route to destination/waypoint) of each electrified unit of the system 10. For example, the control module 52 may compare previous itinerary details and measured energy requirements with upcoming itinerary details and predicted energy requirements to identify an incompatibilities when assigning the priority ranking scores. Thus, electrified units that have higher energy requirements may be assigned a higher priority ranking score within the energy transfer prioritization control strategy 82.

A third factor relevant to assigning each priority ranking score may include the physical/performance limitations of each energy unit of the system 10. For example, the control module 52 may determine whether or not each energy storage device/system is physically capable of supporting energy transfers/loads. The control module 52 may review relevant battery management thresholds (e.g., thermal limitations, reduced charge acceptance, etc.) of the traction battery pack 28, each energy storage system 30, and each traction battery pack 36 as part of its analysis of performance limitations. Electrified units that have performance limitations may be assigned a lower priority ranking score within the energy transfer prioritization control strategy 82.

A fourth factor relevant to assigning each priority ranking score may include conflicting user preference settings. The control module 52 may identify whether any user settings (e.g., settings made within the application 64 or the application 68) are incompatible with other settings of the system 10. For example, the control module 52 may compare a predicted drive route with a current drive direction (e.g., going off course in different direction, alternative plans, etc.) to identify whether any conflicts exist. Electrified units that have user preference settings that are in conflict with other settings of the system 10 may be assigned a lower priority ranking score within the energy transfer prioritization control strategy 82.

The factors referenced above are intended to be exemplary only. Various other factors could be considered by the control module 52 for assigning the priority ranking scores described herein.

The priority ranking scores of each electrified unit of the system 10 may be adjusted during the in-flight event based on various factors. The adjustments may be based on factors such as the real-time trajectory of the electrified vehicle 12, the real-time energy capacity requirements of each electrified unit of the system 10, the real-time energy priority transfer currently being executed by the system 10, environmental factors, etc.

In an embodiment, the control module 52 may assign the traction battery pack 28 of the electrified vehicle 12 a lower priority ranking score during early stages of a drive route and may automatically increase the priority ranking score to a higher level as the electrified vehicle 12 moves closer to the desired destination/waypoint. This ensures that the traction battery pack 28 of the electrified vehicle 12 achieves full charge at a time that is as close as possible to when the electrified vehicle 12 reaches the destination/waypoint (e.g., a "hockey stick" charge approach). Thus, time and distance to the desired destination/waypoint may be important factors that are considered for assigning/adjusting the priority ranking scores associated with each energy unit of the system 10.

In another embodiment, the control module 52 may increase the priority ranking score of the traction battery pack 28 of the electrified vehicle 12 and may decrease the priority ranking score of the traction battery pack 36 of the one or more electrified recreational vehicles 16 when extreme weather is expected to occur during the in-flight event. For example, the control module 52 may automatically decrease the priority ranking score of the traction battery pack 36 of the one or more electrified recreational vehicles 16 when the ambient temperature is above a first temperature threshold (e.g., above about 32° C.) or below a second temperature threshold (e.g., below about −7° C.). When the ambient temperature is between the first and second temperature thresholds, the control module 52 may adjust the priority ranking scores on a sliding scale (e.g., assign higher scores for temperatures falling near a middle of the boundary, assign lower scores for temperatures near the threshold boundaries, and assign mid-scores for temperatures between the middle boundaries and the threshold boundaries).

In another embodiment, the control module 52 may automatically decrease the priority ranking score of the traction battery pack 36 of the one or more electrified recreational vehicles 16 when heavy precipitation is expected upon reaching the destination/waypoint. This strategy may free up energy for charging the electrified vehicle 12 and increasing its storage reserve upon arrival to the destination/waypoint. Alternatively, the control module 52 may command the one or more electrified recreational vehicles 16 to transfer energy to the one or more charge trailers 14 and/or to the electrified vehicle 12 when the one or more electrified recreational vehicles 16 are not expected to be used at the destination/waypoint. Thus, the inferred use of each electrified recreational vehicles 16 may be considered for assigning/adjusting the priority ranking scores associated with each energy unit of the system 10.

In yet another embodiment, the control module 52 may adjust the priority ranking score of the traction battery pack 28 of the electrified vehicle 12 when extreme elevations/gradients are expected along the drive route during the in-flight event. For example, the control module 52 may automatically increase the priority ranking score of the traction battery pack 28 when approaching the elevation/gradient condition, may automatically decrease the priority ranking score of the traction battery pack 28 just before reaching the elevation/gradient condition, and may automatically increase the priority ranking score of the traction battery pack 28 after passing the elevation/gradient condition.

The control module 52 may be programmed to periodically update the priority ranking score assigned to each electrified unit of the system 10 each time a predefined time interval has lapsed. In an embodiment, the predefined time interval is about 10 minutes. However, other time intervals could alternatively be defined as the predefined time interval within the scope of this disclosure.

The control module 52 may further be programmed to command that one or more messages be displayed on the HMI 50 or the personal electronic device 66, for example, each time one of the priority ranking scores is adjusted. The control module 52 may also be configured to command that a message is displayed on the HMI 50 or personal electronic device 66 when the current energy requirements of any of the electrified units of the system 10 are unable to be met under current in-flight conditions.

The control module 52 may further be programmed to communicate/interface with the various energy units of the system 10 in order to execute the energy transfer prioritization control strategy 82. For example, the energy transfer prioritization control strategy 82 may indicate how much (including charge rate), if any, and when charge energy should be transferred from the energy storage systems 30 of the charging trailers 14 and/or the traction battery pack 36 of the one or more electrified recreational vehicles 16 to the traction battery pack 28 of the electrified vehicle 12, and how much, if any, and when charge energy should be transferred from the energy storage systems 30 of the charging trailers 14 and/or the traction battery pack 28 of the electrified vehicle 12 to the traction battery packs 36 of the one or more electrified recreational vehicles 16. The control module 52 may therefore interface with and control the functionality of the bidirectional power transfer systems 40, 42 (e.g., by opening/closing contactors, performing step-up or step-down power conversions, performing power inversions, etc.) and any other related systems/subsystems for coordinating and providing prioritized energy transfers to the energy units of the system 10 during in-flight energy transfer events.

Figure 3:
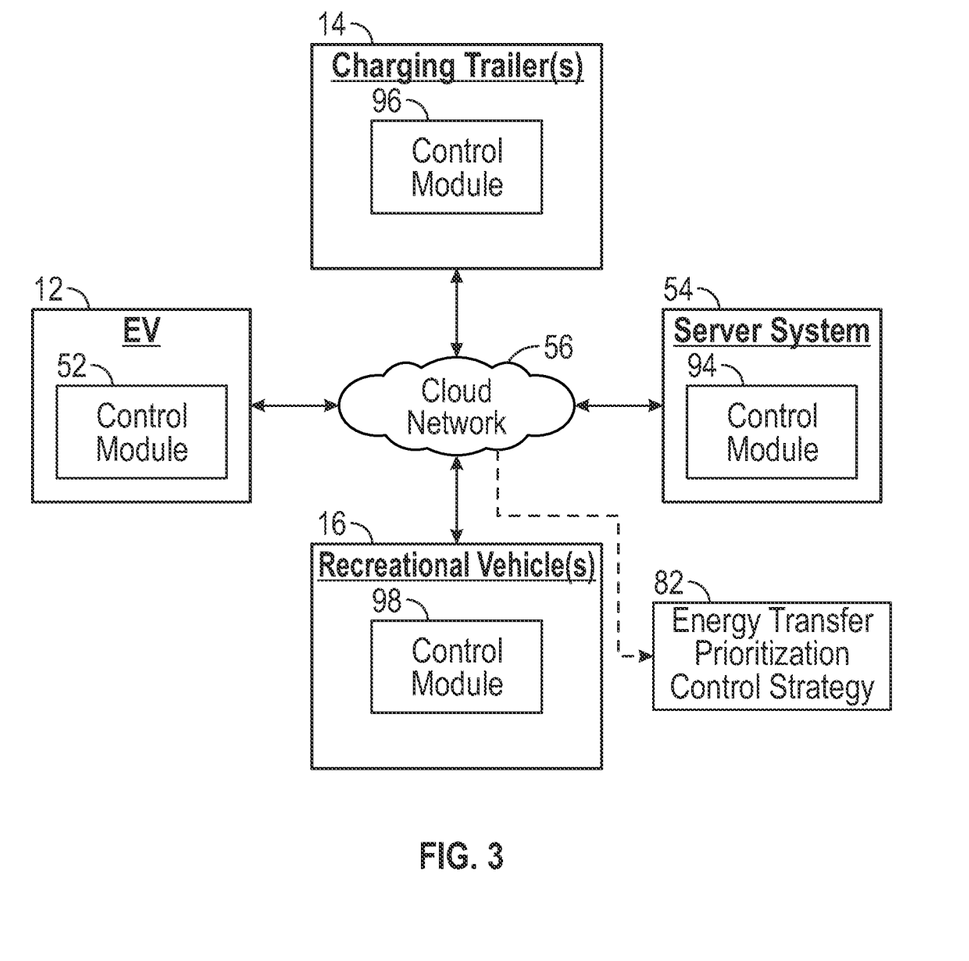
FIG. 3 schematically illustrates a control system of another exemplary bidirectional energy transfer system.

In the embodiments described above, the control module 52 of the electrified vehicle 12 may be configured to function as the communications hub of the system 10. However, other embodiments are also contemplated within the scope of this disclosure. For example, as schematically shown in FIG. 3, a control module 94 of the server system 54 (e.g., a cloud-based control module), a control module 96 associated with each connected charging trailer 14, and/or a control module 98 associated with each connected electrified recreational vehicle 16 could be configured to function as the communications hub of the system 10. In yet another embodiment, the respective control modules of each of the electrified vehicle 12, the one or more charging trailers 14, the one or more electrified recreational vehicles 16, and the server system 54 may operate together over the cloud network 56 to establish a control system for preparing the energy transfer prioritization control strategy 82 and for ultimately controlling the energy transfer prioritization afforded by the system 10.

Figure 4:
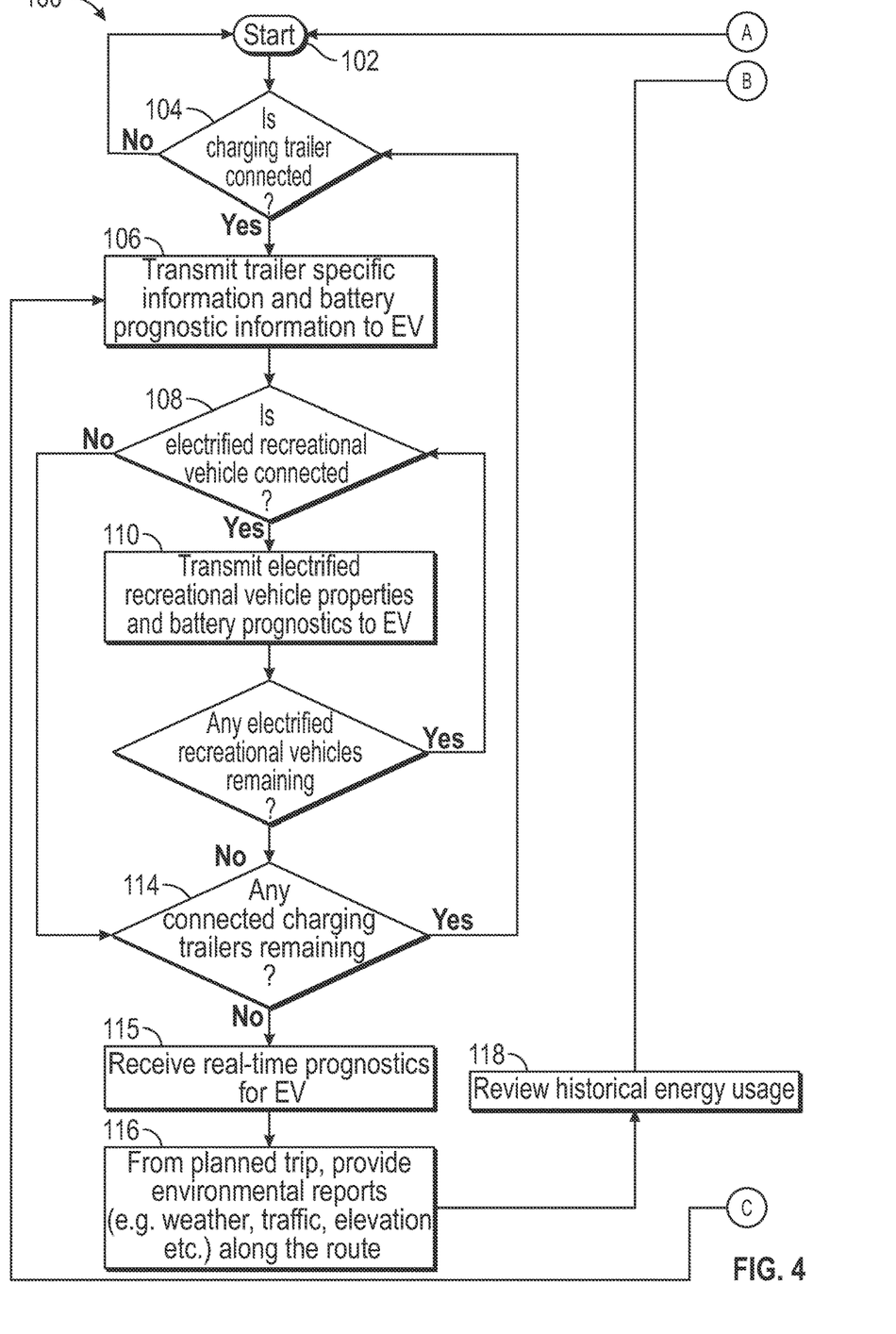
FIG. 4 is a flow chart of an exemplary method for coordinating and controlling power flow during prioritized in-flight bidirectional energy transfers between an electrified vehicle and one or more charging trailers.

FIG. 4, with continued reference to FIGS. 1-3, schematically illustrates in flow chart form an exemplary method 100 for developing and executing the energy transfer prioritization control strategy 82 of the system 10. The energy transfer prioritization control strategy 82 may be utilized to control in-flight energy transfers between the electrified vehicle 12, the one or more charging trailers 14, and the one or more electrified recreational vehicles 16, for example.

The system 10 may be configured to employ one or more algorithms adapted to execute at least a portion of the steps of the exemplary method 100. For example, the method 100 may be stored as executable instructions in the memory 80 of the control module 52, and the executable instructions may be embodied within any computer readable medium that can be executed by the processor 78 of the control module 52. The method 100 could alternatively or additionally be stored as executable instructions in the memories of comparable control modules of the one or more charging trailers 14 and/or the one or more electrified recreational vehicles 16.

The exemplary method 100 may begin at block 102. At block 104, the method 100 may determine whether one or more charging trailers 14 are connected to the electrified vehicle 12. If YES, the method 100 may proceed to block 106 by transmitting the trailer-specific information 86 and the battery prognostic information 84 from each charging trailer 14 to the control module 52 of the electrified vehicle 12.

Next, at block 108, the method 100 may determine whether one or more electrified recreational vehicles 16 are connected to the one or more of the connected charging trailers 14 of the system 10. If YES, the method 100 may proceed to block 110 by transmitting the recreational vehicle-specific information 85 and the battery prognostic information 84 from each electrified recreational vehicle 16 to the control module 52 of the electrified vehicle 12.

The method 100 may next confirm whether all connected electrified recreational vehicles 16 are accounted for at block 112, and may further confirm whether all connected charging trailers 14 are accounted for at block 114. If a NO flag is returned at both of these steps, the method 100 may proceed to block 115.

At block 115, the method 100 may collect the real-time prognostic information 88 from various components/subsystems of the electrified vehicle 12. The method 100 may further collect planned trip information (such as from the GPS 48 and/or the server system 54) and environmental reports (e.g., from the GPS 48 and/or the server system 54) at block 116. The control module 52 may use this information to infer inclement weather, traffic, and/or elevation/retrain along the drive route. The method 110 may further review the user's historical energy usage at block 118.

Next, the method 100 may compare the collected inputs with the predicted energy requirements of each connected energy unit of the system 10 at block 120. The method 100 may then prepare the energy transfer prioritization control strategy 82, including assigning the priority ranking score for each electrified unit of the system 10, at block 122.

Next, at block 124, the method 100 may confirm the functional status of each electrified unit of the system 10. If any functionality error is detected, the method 100 may proceed to block 126 by assigning a low priority ranking score to the electrified unit associated with the faulted system. The user may be notified of the error at block 128. At block 130, a recommendation may be sent to the user for addressing the fault/error or, alternatively, the charge transfer may be disabled. The method 100 may then receive an indication from the user whether or not to retry the charge prioritization process at block 132. If YES, the method may return to block 102 and the prior steps may be repeated. If NO, the method may end at block 134. Alternatively, if no functional faults/errors are detected at block 124, the method 100 may proceed to block 136 by generating a functional status score portion of the priority ranking score for each electrified unit of the system 10.

Next, at block 138, the method 100 may confirm whether any incompatible energy requirements have been identified within the system 10. If YES, the method 100 may proceed to block 140 by notifying the user of any detected incompatibilities and provide recommendations for fixing the incompatibilities. The method 100 may then receive indication from the user whether or not to retry the charge prioritization process at block 132. If YES, the method may return to block 102. If NO, the method may end at block 134. Alternatively, if no energy requirement incompatibilities are detected at block 138, the method 100 may proceed to block 142 by generating an energy requirement score portion of the priority ranking score for each electrified unit of the system 10.

The method 100 may next confirm whether any incompatible performance requirements/limitations have been identified within the system 10 at block 144. If YES, the method 100 may proceed to block 140 by notifying the user of any detected incompatibilities and provide recommendations for fixing the incompatibilities. The method 100 may then receive indication from the user whether or not to retry the charge prioritization process at block 132. If YES, the method may return to block 102. If NO, the method may end at block 134. Alternatively, if no performance requirement/limitation incompatibilities are detected at block 144, the method 100 may proceed to block 146 by generating an energy performance/limitation score portion of the priority ranking score for each connected energy unit of the system 10.

Next, at block 148, the method 100 may confirm whether any incompatible user preference settings have been identified within the system 10. If YES, the method 100 may again proceed to block 140 by notifying the user of any detected incompatibilities and provide recommendations for fixing the incompatibilities. The method 100 may then receive indication from the user whether or not to retry the charge prioritization process at block 132. If YES, the method may return to block 102. If NO, the method may end at block 134. Alternatively, if no user preference incompatibilities are detected at block 148, the method 100 may proceed to block 150 by generating a user preference score portion of the priority ranking score for each connected energy unit of the system 10.

At block 152, the various score portions calculated at blocks 136, 142, 146, and 150 may be aggregated. The aggregated score may then be assigned as the priority ranking score for each connected energy unit of the system 10.

The method 100 may next proceed to block 154. At this step, the method 100 may determine whether the electrified vehicle 12 is approaching (e.g., within a threshold amount of time) its desired destination/waypoint. If YES, the priority ranking score of each connected energy unit of the system 10 may be adjusted per real-time conditions at block 156.

The method 100 may proceed to block 158 from either block 156 or from block 154 (e.g., when a NO flag is returned). At this step, the method 100 may determine whether the electrified vehicle 12 is approaching a congested traffic condition along the drive route. If YES, the priority ranking score of each connected energy unit of the system 10 may be adjusted at block 160.

The method 100 may proceed to block 162 from either block 160 or from block 158 (e.g., when a NO flag is returned). At this step, the method 100 may determine whether the electrified vehicle 12 is approaching extreme weather/elevation/terrain conditions along the drive route. If YES, the priority ranking score of each connected energy unit of the system 10 may be adjusted at block 164.

The method 100 may proceed to block 166 from either block 164 or from block 162 (e.g., when a NO flag is returned). At this step, the method 100 may determine whether the electrified vehicle 12 is within a threshold amount of time (e.g., 20 minutes) from reaching the desired destination/waypoint. If YES, the priority ranking score of each connected energy unit of the system 10 may again be adjusted at block 168.

The method 100 may proceed to block 158 from either block 156 or from block 154 (e.g., when a NO flag is returned). At this step, the method 100 may determine whether the electrified vehicle 12 is approaching congested traffic conditions along the drive route. If YES, the priority ranking score of each connected energy unit of the system 10 may be adjusted at block 160.

At block 170, the method 100 may confirm whether are any additional energy units of the system 10 remain. If YES, the method 100 may return to block 122 and the prior steps may be repeated to account for the remaining units. If NO, the method 100 may proceed to block 172 by sorting the priority ranking scores of the energy units in descending order of highest score to lowest score (e.g., higher scores are of higher priority and lower scores are of lower priority).

The method 100 may confirm whether the user has selected a priority override at block 174. If YES, the method 100 may receive a user input of the re-ordered prioritization at block 176. If NO, the method 100 may proceed with the energy transfers based on the priority ranking scores at block 178.

Next, a block 180, the method 100 may confirm whether a predefined amount of time has elapsed since beginning the energy transfers at block 178. If YES, the method 100 may return to block 106 and various steps are repeated to refresh the priority ranking scores. If NO, the method 100 may proceed to block 182 by confirming whether the energy transfers have been completed. The actual energy transfer measurements performed may be saved to the cloud at block 184 when the transfer is confirmed as being completed. The method 100 may then end at bock 134.

The bidirectional energy transfer systems of this disclosure are designed to coordinate and control power flow during in-flight energy transfer events between an electrified vehicle, one or more charging trailers, and/or one or more recreational electrified vehicles. The systems and methods may prioritize energy transfers between each connected energy unit of the system based on various parameters in order to enable closed-loop energy transfer feedback during actual travel and for recognizing, in real-time, battery thermal issues that could arise in response to environmental changes. The proposed systems and methods may better manage energy flow between connected energy units for achieving dynamic, in-flight energy transfers.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
   a traction battery pack; and
   a control module programmed to create an energy transfer prioritization control strategy for controlling a transfer of energy to the traction battery pack from an energy unit separate from the electrified vehicle during an in-flight energy transfer event of the electrified vehicle,
   wherein the energy transfer prioritization control strategy includes a priority ranking score assigned to the traction battery pack,
   wherein the energy transfer prioritization control strategy is derived based on real-time prognostic information associated with the electrified vehicle, wherein the real-time prognostic information includes a current estimated time of arrival to reach a desired destination associated with a current drive route of the electrified vehicle,
   wherein the priority ranking score is an aggregated score derived from a combination of a functional status score portion, an energy requirement score portion, an energy performance/limitation score portion, and a user preference score portion of the traction battery pack.

2. The electrified vehicle as recited in claim 1, wherein the energy transfer prioritization control strategy is derived based on battery prognostic information associated with the traction battery pack.

3. The electrified vehicle as recited in claim 1, wherein the energy transfer prioritization control strategy is derived based on itinerary/calendar information associated with a user of the electrified vehicle.

4. The electrified vehicle as recited in claim 1, wherein the energy transfer prioritization control strategy is derived based on a real-time weather condition.

5. The electrified vehicle as recited in claim 1, wherein the energy transfer prioritization control strategy is derived based on a real-time traffic condition.

6. The electrified vehicle as recited in claim 1, wherein the energy transfer prioritization control strategy is derived based on an anticipated physical route condition.

7. The electrified vehicle as recited in claim 1, wherein the control module is further programmed to control the transfer of the energy to the traction battery pack for achieving a full charge of the traction battery pack before the electrified vehicle reaches a planned destination/waypoint.

8. The electrified vehicle as recited in claim 1, wherein the control module is further programmed to command a charge rate and a time for transferring the energy to the traction battery pack during the in-flight energy transfer event.

9. A bidirectional energy transfer system, comprising:
an electrified vehicle;
a charging trailer coupled to the electrified vehicle;
an electrified recreational vehicle coupled to the charging trailer, wherein the electrified recreational vehicle is a personal watercraft, an all-terrain vehicle (ATV), a utility vehicle (UTV), a motorcycle, or a bike; and
a control module programmed to create an energy transfer prioritization control strategy for controlling a transfer of energy from the charging trailer to the electrified vehicle and to the electrified recreational vehicle during an in-flight energy transfer event,
wherein the transfer of the energy from the charging trailer to the electrified vehicle is based, at least in part, on real-time prognostic information associated with the electrified vehicle, wherein the real-time prognostic information includes a current traveling speed of the electrified vehicle and a current estimated time of arrival to reach a desired destination associated with a current drive route of the electrified vehicle,
wherein the energy transfer prioritization control strategy includes a first priority ranking score assigned to a first traction battery pack of the electrified vehicle and a second priority ranking score assigned to a second traction battery pack of the electrified recreational vehicle,
wherein the first priority ranking score is lower than the second priority ranking score during a first, earlier stage of the current drive route, and the first priority ranking score is greater than the second priority ranking score during a second, later stage of the current drive route,
wherein the first priority ranking score is an aggregated score derived from a combination of a functional status score portion, an energy requirement score portion, an energy performance/limitation score portion, and a user preference score portion of the first traction battery pack.

* * * * *